L. L. WILLOUR.
COMBINED HAY RACK AND WAGON.
APPLICATION FILED FEB. 15, 1921.

1,402,988.

Patented Jan. 10, 1922.
5 SHEETS—SHEET 3.

Inventor
L. L. Willour

By
Ch. Parker
Attorney

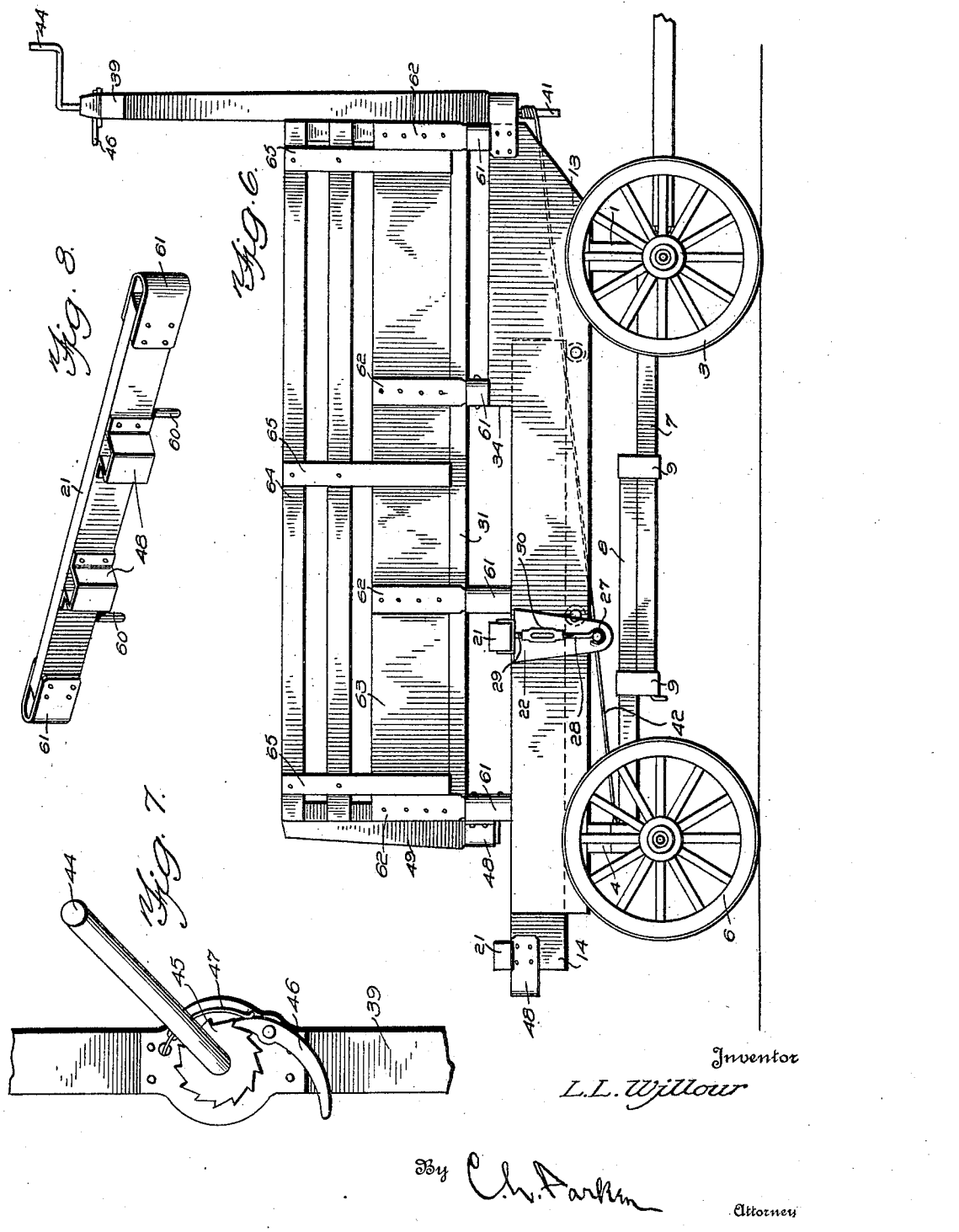

L. L. WILLOUR.
COMBINED HAY RACK AND WAGON.
APPLICATION FILED FEB. 15, 1921.
1,402,988.
Patented Jan. 10, 1922.
5 SHEETS—SHEET 5.
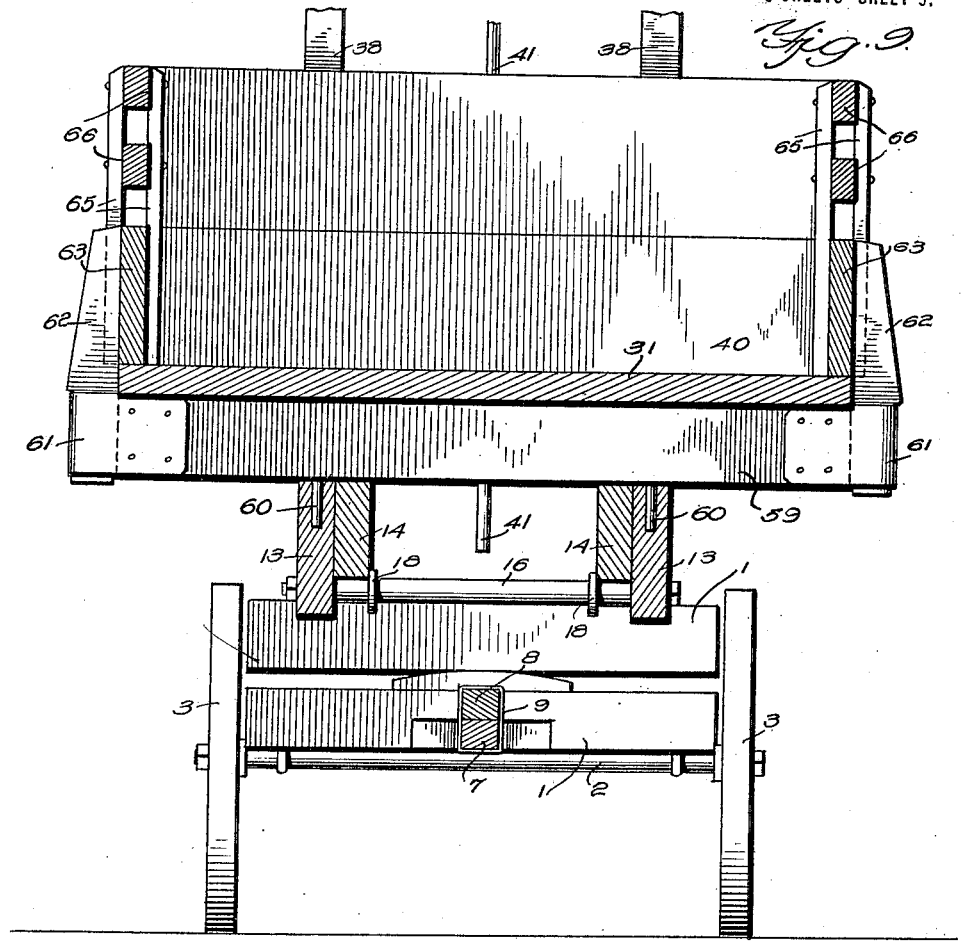
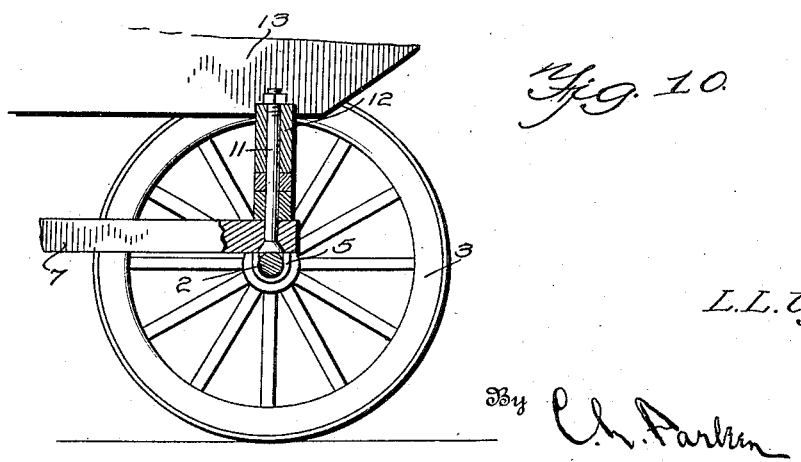
Inventor
L. L. Willour
By C. N. Parker
Attorney

UNITED STATES PATENT OFFICE.

LAWREN LOW WILLOUR, OF WOOSTER, OHIO.

COMBINED HAY RACK AND WAGON.

1,402,988.	Specification of Letters Patent.	Patented Jan. 10, 1922.

Application filed February 15, 1921. Serial No. 445,218.

*To all whom it may concern:*

Be it known that I, LAWREN LOW WILLOUR, a citizen of the United States, residing at Wooster, in the county of Wayne and State of Ohio, have invented certain new and useful Improvements in Combined Hay Racks and Wagons, of which the following is a specification.

This invention relates to combined hay ladders and stock wagons, and it comprises a truck and a body adapted to be mounted on said truck, said truck comprising front and rear axles and an extensible reach whereby the wheel base may be varied, said body comprising an under frame formed in two sections, one of said sections being secured to the front axle and the other to the rear axle whereby the body may be extended when the wheel base is extended, a platform mounted on said under frame and adapted to form the body of the wagon, and means for extending said wheel base and body portion.

In loading hay, the hay rack or hay loader is adapted to receive the hay from a loader which is arranged at the back of the rack. In the ordinary construction of hay rack, it is necessary for workmen to carry the hay from the rear of the rack to the front as the usual length of a hay rack is eighteen feet, there is a great deal of labor involved in the mere arrangement of the hay on the rack. In the present invention, I provide an extensible hay rack wherein the platform may be extended from one-half to two-thirds the original length. It is, therefore, possible to provide a hay rack which, when extended, will be the usual length or eighteen feet, but which may be contracted to a length of ten or twelve feet. When an empty rack is to be loaded, the extensible portion is arranged in closed position so that the distance that the hay is to be carried from the rear to the front is materially decreased. When the front end of the rack is loaded, the extensible part may be opened to permit the full load to be placed on the vehicle.

In the present invention, I have further provided a construction which may be employed as an ordinary farm wagon for hauling grain, oats, etc., and which may be further changed to form a stock wagon for hauling stock. The bottom or platform is permanently mounted on the under frame and does not have to be removed when the wagon is changed to a hay rack. Means are provided for securing the side members and these members may be readily removed when the device is to be used as a hay rack without removing the bottom or platform.

In the accompanying drawings, I have shown one embodiment of the invention. In this showing:

Figure 1:
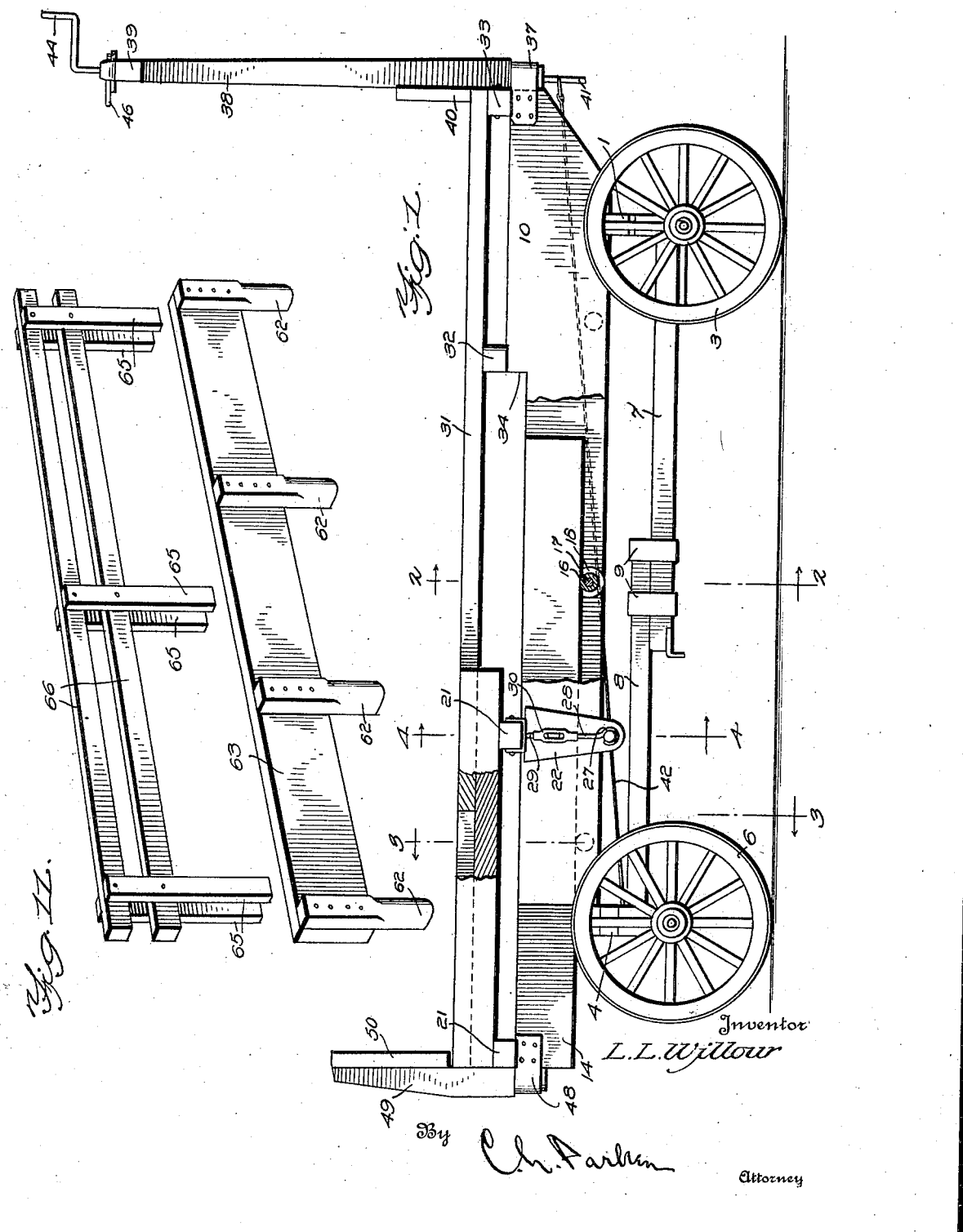
Figure 1 is a side elevation of a hay rack, parts being shown in section.
Figure 2:
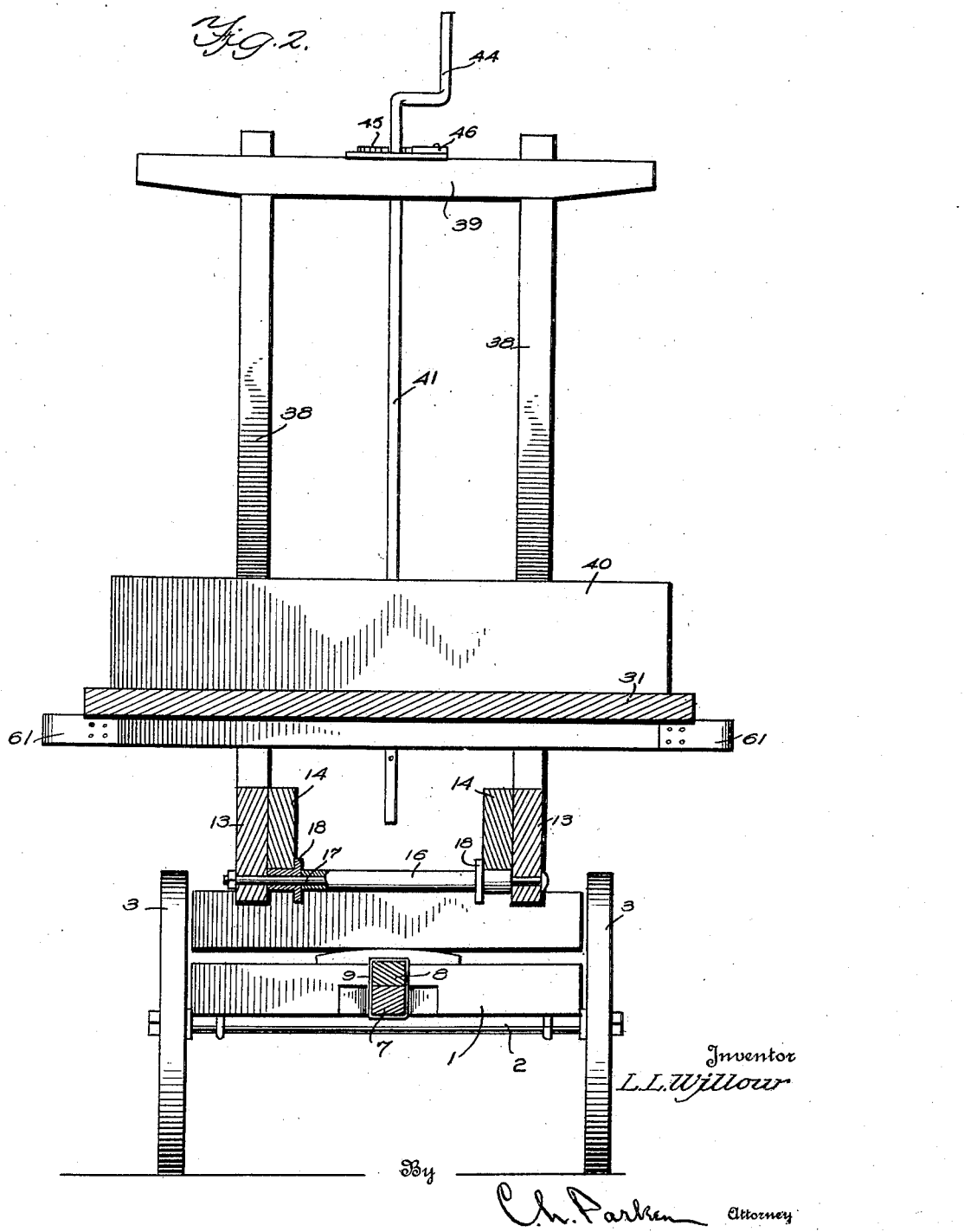
Figure 2 is a transverse vertical sectional view on line 2—2 of Figure 1.
Figure 3:
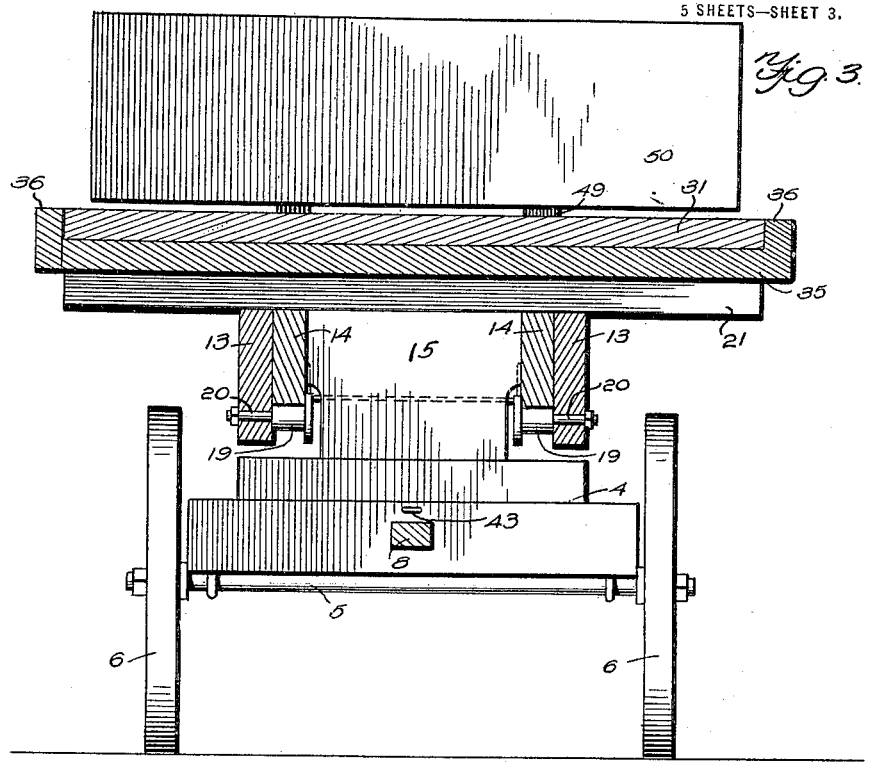
Figure 3 is a similar view on line 3—3 of Figure 1.
Figure 4:
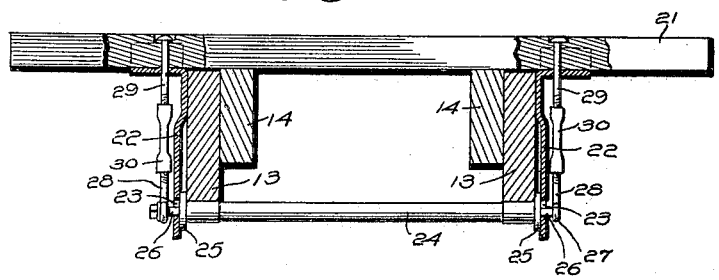
Figure 4 is a similar view on line 4—4 of Figure 1.

Figure 6 is a side elevation of a grain wagon showing the telescoping parts in closed position, Figure 7 is a detail view of the operating mechanism, Figure 8 is a detail view of a supporting member employed in the wagon construction, Figure 9 is a transverse sectional view of the wagon, Figure 10 is a detail sectional view through the axle and axle support, and, Figure 11 is a detail perspective view of the attachment for forming a stock wagon.

Referring to the drawings, the reference numeral 1 designates the front truck which carries an axle 2, having wheels 3, mounted thereon. The rear truck 4 is likewise provided with an axle 5, carrying traction wheels 6. The front and rear trucks are connected by a reach which is made in two sections 7 and 8, secured to the front and rear truck respectively. Each of these members is provided with a sleeve 9, adapted to receive the other member, and thus permit the members to be adjusted, and maintained parallel to each other. By this means, the reach may be lengthened or shortened to vary the wheel base.

The under frame of the vehicle comprises a main section 10, which is connected to the front truck by means of a king bolt 11 (see Figure 10) to permit steering of the wagon. The member 10 comprises a transverse beam 12, and a pair of longitudinal side rails 13.

The telescoping section of the frame comprises a pair of side rails 14, arranged beside the side rails of the main frame and connected to each other by a bolster 15. This bolster is secured to the rear truck of the vehicle in any suitable manner. The side rails 13 of the main frame are connected, at intervals, by shafts or rollers 16, mounted on rods 17 and provided with flanges 18, adapted to engage the edges of the longitudinal members 14 to maintain them in proper position. Any number of guide rollers of this type may be provided. The rear rollers 19 are mounted on rods 20, which do not extend across the frame to permit the bolster 15 to pass the rollers when the wheel base is reduced.

The side bars 14 of the telescoping frame are connected at suitable intervals by means of transverse rods or beams 21. One of these beams is adapted to receive a substantially L-shaped bracket 22, arranged on each side of the body and extending downwardly to a point below the side rails 13 of the main frame. These brackets are provided with slots 23, for the reception of the ends of a roller 24, having flanges 25 adapted to engage the rails 13 and the main frame. As shown, the slots 23 are elongated to permit adjustment of the roller to maintain it in engagement with the under surface of the rail 13. The ends of the roller are reduced, as at 26, and are adapted to be received in eyes 27 formed on the end of screws 28. The screw 28 is connected to a screw 29 by means of a turn-buckle, the screw 29 being mounted in the transverse member 21. It will be seen that the construction of the guiding members with the flanges on the rollers 16 engaging the inner sides of the longitudinal members 14, and the flanges 25 of the rollers 24 engaging the outside of the longitudinal members 13, maintains the members in contact with each other.

The platform is adapted to be arranged on the frame, the main section 31 being secured to the main frame and supported by transverse members 32 and 33. As shown, the side rails 13 are cut away as at 34, to provide a forward section of greater height than the remainder. This provides a space for the reception of the telescoping portion 35 of the platform. This section 35 is supported by the members 21 of the telescoping frame and is adapted to be received beneath the main platform 31 when the vehicle is closed. As shown, it is provided with flanges 36 at each side to maintain the platforms in proper position.

The forward ends of the longitudinal members 13 are provided with clips or sleeves 37 for the reception of the lower ends of uprights 38. These uprights are connected to each other near their upper ends by a transverse member 39, and are also connected by a member 40 adapted to be arranged immediately above the wagon platform when in position and form a portion of the wagon body. A shaft 41 is mounted in the member 39 and this shaft has secured thereto, a flexible element 42 which is adapted to be secured to the rear truck in any suitable manner, as at 43. I find it advisable to provide a detachable connection between the flexible element and the rear truck. The shaft 41 is provided with an operating handle 44 and a ratchet wheel 45 is arranged on the shaft above the member 39. A pivoted pawl 46 is adapted to engage the ratchet to prevent the cable 42 from unwinding. This pawl is maintained in operative position by spring 47.

Figure 5:
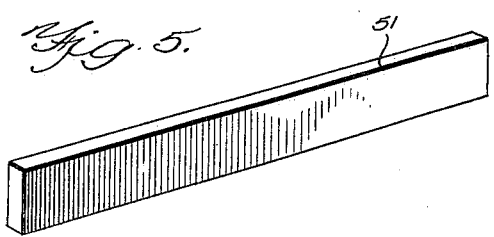
Figure 5 is a perspective view of one of the side boards used in a grain wagon.

When the wagon is to be employed as a stock wagon, or as an ordinary farm wagon for hauling grain or other loose material, the side boards may be arranged in position and the platform 31, 35 which serves as the bottom of the hay rack also is used in the wagon construction, eliminating the necessity of lifting heavy wagon bodies to change the wagon from a hay rack to a stock wagon. A pair of clips 48 are arranged on the rear of the longitudinal members 14 of the telescoping frame and these clips are adapted to receive standards 49. The rear board 50 of the wagon is secured to these standards. This member 50 is slightly spaced from the bottom of the wagon body, and a member 51 (see Figure 5) is adapted to be arranged beneath it when grain or other loose material is being carried. When the side boards are to be put on the vehicle, a transverse member 59 is arranged between the longitudinal members 13 and the bottom of the wagon body, the transverse member being provided with pins 60, adapted to be secured in openings in the member 13. This member carries a sleeve or clip 61, at each end, for the reception of standards 62. Any number of transverse members of this character may be employed, being suitably spaced for the reception of standards carried by side boards 63. When the side boards 63 are arranged in position an ordinary wagon body is provided, of a depth of 12 to 14 inches. When the wagon is to be employed as a stock wagon, the height of the sides may be increased by complementary side members 64. In Figure 11 of the drawings, I have shown a detail view of the construction of these members comprising a pair of upright members 65, spaced from each other and adapted to be arranged on opposite sides of the side boards. These members are connected by longitudinal bars 66 spaced from each other to form slats.

The construction provides a farm wagon which may be employed in a number of different ways and which is very useful to a farmer at different seasons. The device may be employed as a hay rack and may be changed to a stock wagon or an ordinary farm wagon by one man without assistance.

This is very important as in the constructions heretofore provided which may be changed from a hay rack to a wagon, it is necessary to remove the entire body and quite frequently a farm is worked by one man who is physically unable to lift the heavy body from the wagon. When in use as a hay rack, the telescoping portion is first closed, and as the rack is loaded, the flexible element is unwound from the shaft 41 and the horses are allowed to move the front wheels to take up the slack in the flexible element, thus lengthening the wheel base. After the hay has been placed in the barn, the telescoping portion may be readily closed by disengaging the ratchet 46 and winding up the flexible element on the shaft 41.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. An extensible hay rack comprising front and rear trucks, an extensible reach connecting said trucks, a telescoping frame supported on said trucks, said frame comprising a main section secured to said front truck, and having a pair of longitudinal side rails, a telescoping section secured to said rear truck and having a pair of longitudinal side rails arranged adjacent the side rails of the main section, guide rollers carried by one of said pair of rails adapted to engage the other pair of rails to maintain them in position, a platform arranged on said main section, and a telescoping platform arranged on said telescoping section.

2. An extensible hay rack comprising front and rear trucks, an extensible reach connecting said trucks, a telescoping frame supported on said trucks, said frame comprising a main section and a telescoping section, said main section being secured to said front truck and having longitudinal side rails, said telescoping section being secured to said rear truck and having longitudinal side rails arranged adjacent the rails of the main section, guide rollers carried by one of said rails, said pair of guide rollers being provided with flanges adapted to engage the sides of the other rails, an extensible body arranged on said frame, said body comprising a pair of telescoping sections secured to said main frame and said telescoping frame respectively.

3. An extensible hay rack comprising front and rear trucks, an extensible reach connecting said trucks, a telescoping frame supported on said trucks, said frame comprising a main section secured to said front truck, a telescoping section secured to said rear truck, means for maintaining said sections in longitudinal alinement, a platform mounted on said main section of the truck, and a platform section carried by said telescoping section of the truck, said platform section being provided with side flanges adapted to engage the sides of the platform to maintain them in longitudinal alinement.

4. An extensible hay rack comprising front and rear trucks, an extensible reach connecting said trucks, a telescoping frame supported on said trucks, said frame comprising a main section secured to said front truck, a pair of longitudinal side rails carried by said main section, a telescoping section secured to said rear truck, said telescoping section having a pair of longitudinal side rails arranged adjacent the side rails of the main section, transverse rods carried by said first mentioned side rails, rollers mounted on said rods and adapted to engage the said second mentioned side rails, said rollers being provided with flanges adapted to engage the side of said rails, and an extensible body arranged on said frame.

In testimony whereof I affix my signature in presence of two witnesses.

LAWREN LOW WILLOUR.

Witnesses:
Wm. C. Yost,
W. E. Weygandt.